(12) United States Patent
Beimdieck et al.

(10) Patent No.: US 10,632,861 B2
(45) Date of Patent: *Apr. 28, 2020

(54) LIQUID-COOLED CONTACT ELEMENT

(71) Applicant: HARTING Automotive GmbH, Espelkamp (DE)

(72) Inventors: Carsten Beimdieck, Ibbenbüren (DE); Alexander Bruland, Rahden (DE)

(73) Assignee: HARTING Automotive GmbH, Espelkamp (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/305,836

(22) PCT Filed: Jun. 30, 2017

(86) PCT No.: PCT/DE2017/100550
§ 371 (c)(1),
(2) Date: Nov. 29, 2018

(87) PCT Pub. No.: WO2018/006903
PCT Pub. Date: Jan. 11, 2018

(65) Prior Publication Data
US 2019/0315239 A1     Oct. 17, 2019

(30) Foreign Application Priority Data

Jul. 5, 2016   (DE) .................. 10 2016 112 306

(51) Int. Cl.
*H01R 24/20*   (2011.01)
*B60L 53/16*   (2019.01)
(Continued)

(52) U.S. Cl.
CPC ............. *B60L 53/16* (2019.02); *B60L 53/302* (2019.02); *H01B 7/423* (2013.01); *H01R 13/42* (2013.01);
(Continued)

(58) Field of Classification Search
CPC ...... H01R 13/42; H01R 13/111; H01R 24/20; H01R 12/716; H01R 13/113; H01R 13/6587; H01R 13/514
See application file for complete search history.

(56) References Cited

U.S. PATENT DOCUMENTS 3,244,792 A   4/1966 Smith
3,324,225 A * 6/1967 Thostrup ................ B23K 9/173
                                                              174/47
(Continued)

FOREIGN PATENT DOCUMENTS

CN         102077441 A    5/2011
CN         202523938 U   11/2012
(Continued)

OTHER PUBLICATIONS

International Preliminary Report on Patentability, dated Jan. 8, 2019, for International Application No. PCT/DE2017/100550, 7 pages.
(Continued)

*Primary Examiner* — Xuong M Chung Trans
(74) *Attorney, Agent, or Firm* — Seed IP Law Group LLP

(57) ABSTRACT

An electrical contact element for a car charging plug connector is disclosed, which electrical contact element has a contact part and a connection part, wherein the connection part can be connected to an electrical conductor of a cable. Cooling liquid can be delivered to the contact element. As a result, the heat produced on the contact element is extracted directly. Therefore higher currents can be transmitted by such a contact element than by known contact elements.

13 Claims, 4 Drawing Sheets

(51) Int. Cl.
*B60L 53/302* (2019.01)
*H01B 7/42* (2006.01)
*H01R 13/42* (2006.01)
*H01R 13/11* (2006.01)
*H01R 101/00* (2006.01)

(52) U.S. Cl.
CPC ............ *H01R 24/20* (2013.01); *H01R 13/111* (2013.01); *H01R 2101/00* (2013.01); *H01R 2201/26* (2013.01)

(56) References Cited

U.S. PATENT DOCUMENTS

| | | | | |
|---|---|---|---|---|
| 3,610,875 | A | * | 10/1971 | Dal Molin ............. B23K 9/291 219/137.63 |
| 6,328,615 | B1 | * | 12/2001 | Safai ...................... H01R 13/03 439/825 |
| 7,511,245 | B2 | * | 3/2009 | Hsu ........................ B23K 9/201 219/98 |
| 10,109,395 | B2 | * | 10/2018 | Beimdieck ........... H01R 13/005 |
| 2009/0273310 | A1 | | 11/2009 | Flack |
| 2013/0267115 | A1 | | 10/2013 | Mark |
| 2017/0279210 | A1 | * | 9/2017 | Kraemer .............. H01R 13/506 |

FOREIGN PATENT DOCUMENTS

| | | |
|---|---|---|
| CN | 204760561 U | 11/2015 |
| DE | 10 2010 050 562 B3 | 4/2012 |
| FR | 2 723 466 A1 | 2/1996 |
| WO | 2012/151484 A1 | 11/2012 |

OTHER PUBLICATIONS

German Office Action, dated Mar. 17, 2017, for German Application No. 10 2016 112 306.4, 6 pages.
International Search Report and Written Opinion, dated Sep. 1, 2017, for International Application No. PCT/DE2017/100550, 10 pages. (with English Translation of Search Report).
Chinese Office Action for patent application No. 201780041914.4 dated Oct. 9, 2019, 7 pages.
Japanese Office Action for patent application No. 2018-562314 dated Jan. 7, 2020, 7 pages.

* cited by examiner

LIQUID-COOLED CONTACT ELEMENT

BACKGROUND

Technical Field

The disclosure relates to a liquid-cooled contact element which is adapted to be connected to an electrical conductor of a cable. The disclosure furthermore relates to a plug connector which uses such a contact element.

Contact elements of this type are employed in particular to transmit high currents and are used, for example, in charging plug connectors.

Rapid charging is necessary for electric vehicles if this technology is to prevail over conventional vehicles with a combustion engine. Vehicles with a combustion engine can be filled up with petrol in a few minutes. Electric vehicles need to compete here. Particularly high currents have to be used for rapid-charging procedures, which results in the generation of a significant amount of heat in charging plug connectors.

Description of the Related Art

FR 2 723 466 A1 discloses a power-supply means for a welding tool or a similar tool. The power-supply means consists of a connection piece and a body formed thereon, wherein the power-supply means is designed as a single piece. An adapter is connected to the body of the power-supply means via a screwed connection. Water is supplied to the power-supply means via the adapter as a coolant. The water flows into a cavity of the body and is led away again via a further adapter screwed onto the body.

DE 10 2010 050 562 B3 discloses a charging plug connector for electric cars. The heating of the plug connector caused as part of the charging process is reduced by a spiral liquid line which runs essentially in the handle region of the plug connector. A coolant flows through the liquid line in a closed cooling circuit.

In the case of the plug connector described, only the plug connector is cooled. As before, heat can build up during operation in the contact elements and the electrical conductors connected thereto, which can result in a loss of capacity of the plug connector and longer associated charging processes.

BRIEF SUMMARY

Embodiments of the present invention provide a conductive contact element, in particular for use in charging plug connectors.

The electric contact element according to embodiments of the present invention is optimally suited for use in charging plug connectors. Charging plug connectors of this type are used, for example, for charging electric cars.

The contact element has a contact part and a connecting part. The connecting part is designed such that it can be connected to an electrical conductor of a cable. Coolant can be conveyed to the contact element. Cavities, into which coolant can flow and thus absorb and dissipate heat, are present in the connecting part of the contact element. For this purpose, the connecting part can be connected to an inlet line for coolant. The electrical conductor and the inlet line can be connected to the contact element.

The electrical contact element advantageously has an at least two-part design. The connecting part and the contact part are each formed by separate components. The separate components can be reversibly connected to each other.

The two-part design has the advantage that the contact part can be replaced after a certain number of plugging cycles, whilst the connecting part can be used again. By replacing the contact parts, a plug connector can be reused very quickly. A further advantage of this structure is that the connecting part and the contact part can be formed from different materials. The materials can be chosen as required. The contact part can, for example, be provided with a coating which is a particularly good conductor, for example with a silver or gold alloy. A coating of this type is not necessary for the connecting part. It can here accordingly be omitted.

In an advantageous embodiment of the invention, the connecting part and the contact part can be designed so that they can be screwed to each other. It is consequently possible to remove a contact part which has become worn as a result of various plugging cycles from the plug connector at the plugging side, and to replace it with a new contact part.

The contact part of the contact element may be advantageously formed as a so-called jack with, for example, four or six blades. The connecting part has an essentially cylindrical design and has a hollow cylinder protruding axially therefrom. At least one opening, but preferably two, three, or four openings, is/are introduced in the connecting part.

In an advantageous embodiment of the invention, the cavity of the opening or the cavities of the openings are connected to the cavity of the hollow cylinder. Coolant can flow into the opening or into the openings of the connecting part and the coolant can flow out again through the hollow cylinder. The coolant can here act directly on the contact element. The cooling effect occurs precisely where the heat is also produced during operation. The cooling of the contact element is therefore also particularly effective, in particular when the contact element is used in a charging plug connector for electric vehicles. Charging plug connectors of this type require no additional cooling.

The cable connected to the contact element according to embodiments of the invention comprises in cross-section of a central coolant line. Individual conductors, copper cores in this case, are positioned around the coolant line. The copper cores are surrounded by a liquid-tight film. So-called buffer elements lie on this film and are finally surrounded by a solid cable sheath. The buffer elements are likewise hollow such that a coolant can flow between the liquid-tight film and the cable sheath.

The hollow cylinder of the connecting part of the contact element, according to a particularly advantageous embodiment, tapers at the end and has an outlet opening. A continuous blade structure is attached to or provided on the hollow cylinder upstream from the outlet opening. The blade structure serves for contacting, with good conductance, between a conductor and the contact element.

The outlet opening of the hollow cylinder of the connecting part of the contact element is pushed into the central coolant line. For this purpose, the external diameter of the outlet opening and the internal diameter of the central coolant line match each other.

The individual conductors of the above described cable are laid against the blade structure of the hollow cylinder. The conductors are pressed firmly onto the blade structure with the aid of a crimp sleeve. The blade structure ensures a connection, with particularly good conductance, of the conductors to the connecting part.

The contact element has a sleeve which covers the connecting part on one side at least partially. Two circumferential grooves, inside each of which a sealing ring is laid, are introduced in the connecting part. The overlapping region of the sleeve and the connecting part is sealed so that it is media-tight by the seals. The other end of the sleeve extends on the cable sheath of the cable. The internal diameter of the sleeve and the external diameter of the cable match each other. The overlapping region of the sleeve and the cable can be sealed so that it is media-tight by squeezing the sleeve.

The contact element according to embodiments of the invention is cooled as follows: the coolant flowing in the region of the buffer elements travels as far as the connecting part of the contact element and enters the opening or the openings in this region, into the contact element. The liquid is capable of absorbing heat energy. The coolant leaves the connecting part again via the hollow cylinder and is discharged again via the central coolant line of the cable. The cooling process described here is a cycle. Fresh coolant flows permanently around the contact element.

BRIEF DESCRIPTION OF THE SEVERAL VIEWS OF THE DRAWINGS

An exemplary embodiment of the invention is shown in the drawings and explained in detail below. In the drawings.

DETAILED DESCRIPTION

Figure 1:
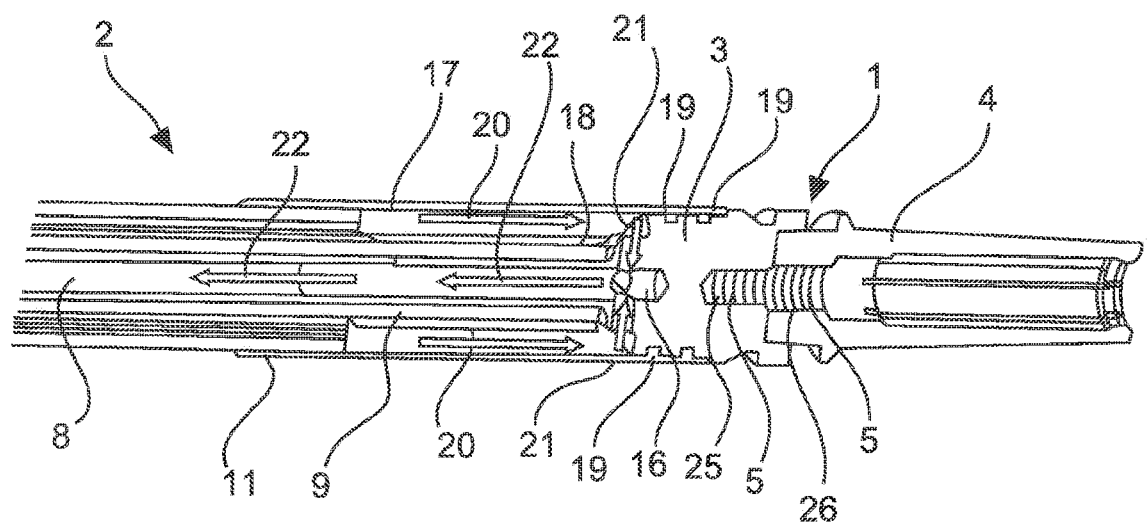
FIG. 1 shows a perspective view in section of a contact element with a connected cable.
Figure 2:
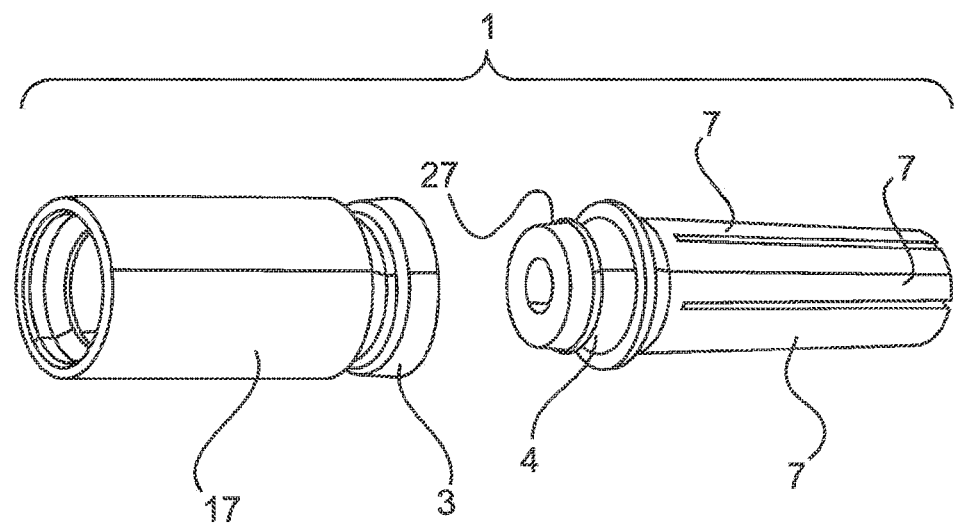
FIG. 2 shows a perspective exploded drawing of the contact element with a sleeve on the connecting part.
Figure 3:
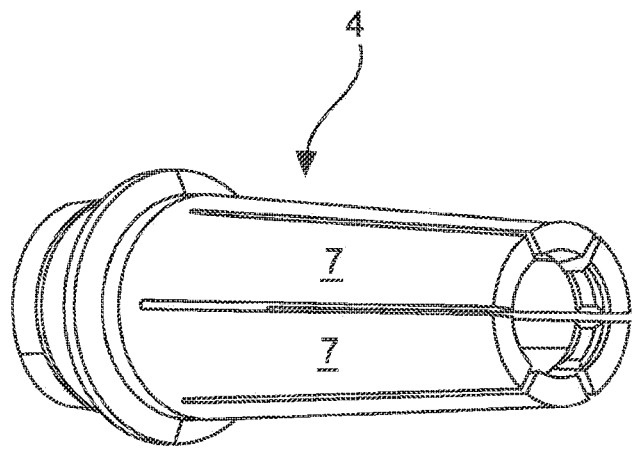
FIG. 3 shows a perspective view of a contact part of the contact element.
Figure 4:
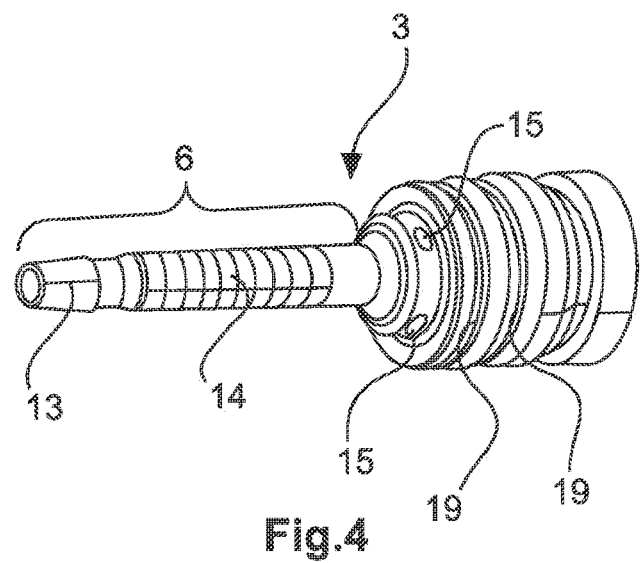
FIG. 4 shows a perspective view of a connecting part of the contact element.

The Figures contain partially simplified schematic views. The same reference numerals are partly used for the same but possibly non-identical elements. Different views of the same elements could be shown at different scales.

FIG. 1 shows a contact element 1 which is electrically connected to a cable 2 with an integrated coolant line. The contact element 1 consists or comprises of a connecting part 3 and a contact part 4. The connecting part 3 comprises an axial bore 25 and the contact part 4 comprises an axial through-bore 26. Both the bore 25 and the through-bore 26 each comprise an internal thread 5 and can be connected reversibly to each other via a screw (not shown). A knurl 27, which prevents rotation between the connecting part 3 and the contact part 4, is formed on the contact part 4. If the contact part 4 becomes worn after many plugging cycles, a fresh contact part 4 can be attached without there being any need for the cable 2 to be reconnected to the contact element 1. The cable 2 can remain permanently on the connecting part 3.

The contact part 4 is designed as a so-called jack with a total of 6 blades 7. The connecting part has an essentially cylindrical design. A hollow cylinder 6 is integrally formed on a main body of the connecting part 3 so that it protrudes axially therefrom. The hollow cylinder 6 can also be viewed as a hollow needle. The hollow cylinder 6 tapers toward the end and opens out in an outlet opening 13. A blade structure 14 is applied on the hollow cylinder 6 between the outlet opening 13 and the main body. Openings 15, which allow access to a cavity 16 inside the connecting part 3, are introduced in the connecting part 3. A plurality of openings 15 are provided rotationally symmetrically along the sheath surface of the connecting part 3. The openings 15 each have the same spacing from one another. The cavity 16 is likewise connected to the cavity which forms the hollow cylinder 6.

Figure 6:
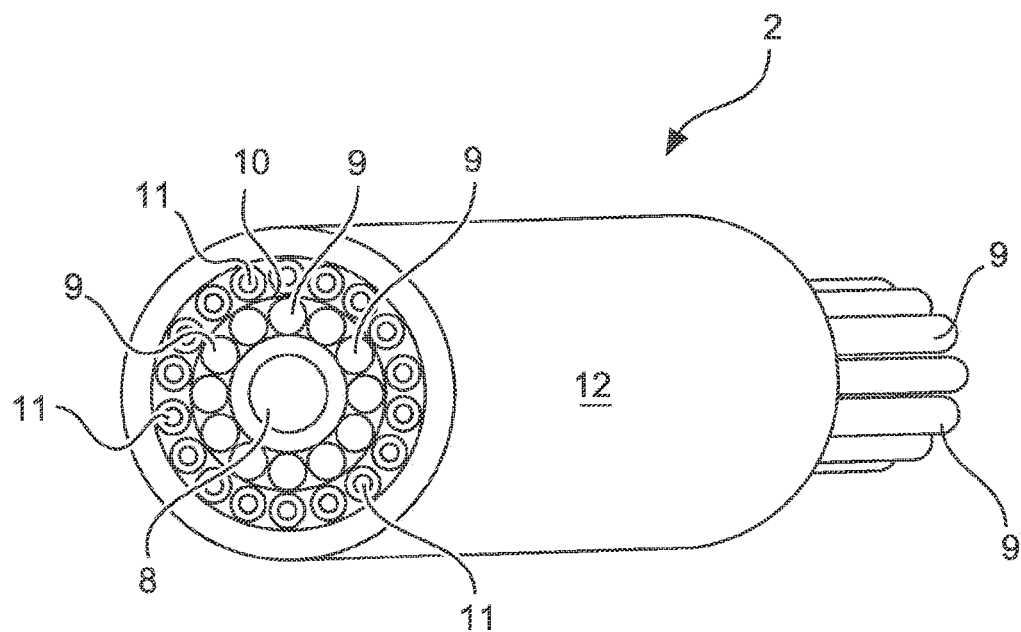
FIG. 6 shows a perspective view of a cable with an integrated coolant line.
Figure 7:
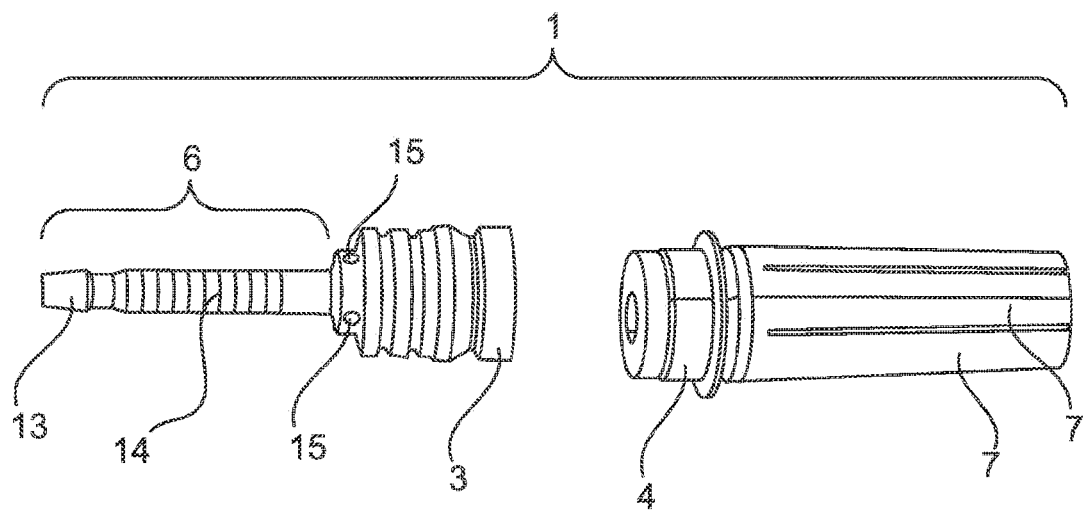
FIG. 7 shows a perspective exploded drawing of the contact element.

The cable 2 connected to the contact element 1 comprises, in cross-section, of a central coolant line 8. Individual conductors 9, in this case copper cores, are positioned around the coolant line 8. The copper cores are surrounded by a liquid-tight film 10 (FIG. 6). So-called buffer elements 11 lie on this film 10 and are finally surrounded by a solid cable sheath 12. The buffer elements 11 likewise have a hollow design such that a coolant can flow in the region between the liquid-tight film 10 and the cable sheath 12. The cable 2 is fastened on the contact element 1 via a sleeve 17. The connecting part 3 has two circumferential grooves 19 in each of which a seal (not indicated for illustrative reasons) is arranged. The sleeve 17 is sealed so that it is media-tight via the sealing rings.

Figure 5:
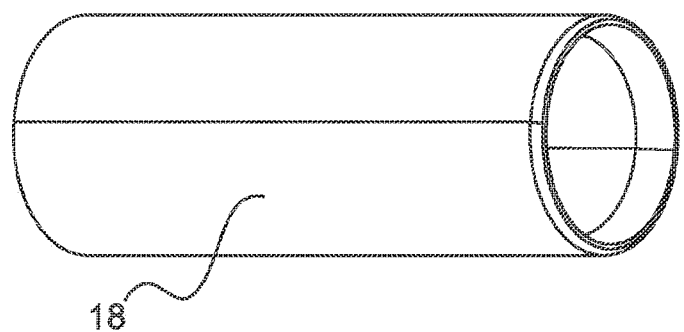
FIG. 5 shows a perspective view of a crimp sleeve.

The outlet opening 13 of the hollow cylinder 6 of the connecting part 3 is pushed into the central coolant line 8 of the cable 2. The internal diameter of the coolant line 8 is matched to the external diameter of the hollow cylinder 6 or of the outlet opening 13. The geometry of the outlet opening 13 prevents the hollow cylinder 6 from slipping out of the coolant line 8. The electrical conductors 9 of the cable 2 bear in an electrically conductive fashion on the blade structure 14 of the hollow cylinder 6. The conductors 9 are fastened on the hollow cylinder 6 via crimp sleeve 18 (FIG. 5). On the cable 2 side, the crimp sleeve 18 covers part of the liquid-tight film 10. At the other end, the crimp sleeve 18 seals the main body of the connecting part 3 liquid-tightly. The conductors 9 are accordingly sealed liquid-tightly.

The connecting part 3 has a cavity 16 through which coolant can flow. The volume of the cavity can be adjusted such that sufficient heat can be discharged via the coolant but the connecting part 3 still has sufficient solidity.

On the cable sheath side, the coolant flows, with reference to FIG. 1, in the direction of the arrow 20 through the sleeve 17 and from there in the direction of the arrow 21 into the openings 15 of the connecting part 3. Coolant flows through the cavity 16 of the connecting part 3. The heat which is generated here during operation is absorbed by the coolant and transported away again via the cavity of the hollow cylinder 6 in the direction of the arrow 22 via the central liquid line 8. In a remote system, the coolant can be cooled down again and be recycled to the openings 15.

Figure 8:
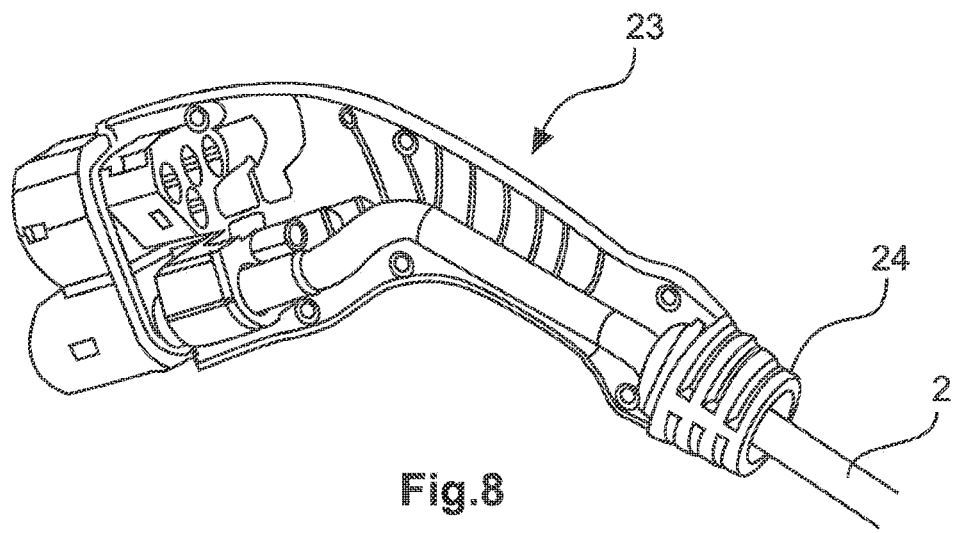
FIG. 8 shows a perspective view in section of a plug connector with an integrated contact element.

An open housing of a plug connector 23, in which the contact element 1 is installed and connected to a cable 2, is shown in FIG. 8. The plug connector 23 generally comprises at least two contact elements 1 and also two cables 2 connected thereto which contain a coolant. The plug connector 23 can contain further non-cooled contact elements (not shown), for example for control signals, which are in each case connected to a cable with no cooling function. The two cables 2 and further cables are combined in a flexible tube (not indicated for illustrative reasons) which departs from the cable outlet 24 of the plug connector 23.

Figure 9:
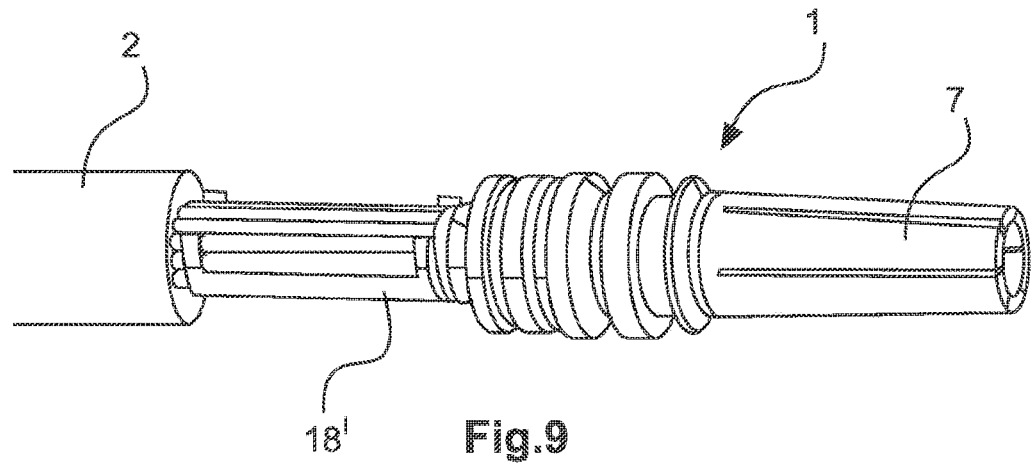
FIG. 9 shows a perspective view of the contact element with a connected cable and a two-part crimp sleeve.

FIG. 9 shows an alternative embodiment of the contact element 1 with a connected coolant-conducting cable 2. The crimp sleeve 18' here has a two-part design. Only part of the two-part crimp sleeve 18' is shown in FIG. 9 for illustrative reasons.

Figure 10:
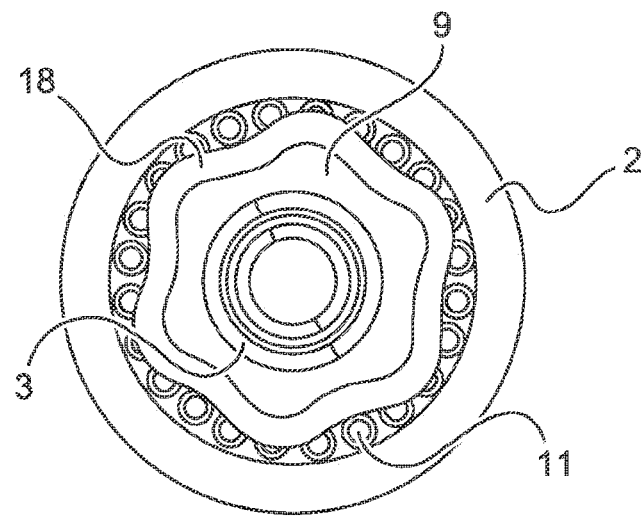
FIG. 10 shows a view in section of the connecting part.

A particular type of crimping of the crimp sleeve 18 is shown in FIG. 10. The crimp sleeve 18 is made into a so-called hex star crimping form. A uniform and particularly gas-tight crimping is achieved as a result. This type of crimping moreover has very low resistance values. The individual conductors 9 are squeezed together beneath the crimp sleeve 18 and are in contact with one another. A closed conductive copper layer is consequently formed around the connecting part 3. In the region of the buffer elements 11, the coolant can flow via the crimp sleeve 18 as far as the contact element 1 and its connecting part 3.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system, comprising:
   a fluid-cooled electric cable having at least one electrical conductor and a central cooling fluid line surrounded by hollow buffer elements, the at least one electrical conductor, the central cooling fluid line and the hollow buffer elements extending along a length of the fluid-cooled electric cable; and
   an electric contact element including a contact part and a connecting part, wherein the connecting part is adapted to be connected to the at least one electrical conductor of the fluid-cooled electric cable,
   wherein coolant can be conveyed to the contact element via the hollow buffer elements of the fluid-cooled electric cable,
   wherein the electric contact element has an at least two-part design and the connecting part and the contact part are each formed by separate components which can be reversibly connected to each other, and
   wherein the connecting part has a cavity through which the coolant can flow before exiting the electric contact element into the central cooling fluid line of the fluid-cooled electric cable.

2. The system of claim 1, wherein the connecting part and the contact part of the electric contact element are adapted to be screwed to each other.

3. The system of claim 1, wherein the contact part of the electric contact element is designed as a jack.

4. The system of claim 3, wherein the jack has four or six blades.

5. The system of claim 1, wherein the connecting part of the electric contact element has an essentially cylindrical design and has a hollow cylinder.

6. The system of claim 1, wherein the connecting part of the electric contact element has at least one opening in fluid communication with the cavity.

7. The system of claim 1, wherein the connecting part of the electric contact element has two, three, or four openings in fluid communication with the cavity.

8. The system of claim 5, wherein the cavity of the connecting part of the electric contact element is accessible by one or more openings in the connecting part, and wherein the cavity is connected to a cavity of the hollow cylinder.

9. The system of claim 8, wherein coolant can flow from the hollow buffer elements of the fluid-cooled electric cable into the one or more openings of the connecting part, and the coolant can flow out through the hollow cylinder into the central cooling fluid line of the fluid-cooled electric cable.

10. The system of claim 1, wherein the electric contact element further comprises a sleeve which at least partially covers the connecting part.

11. The system of claim 5, wherein the hollow cylinder of the connecting part has an outlet opening at an end thereof, and wherein a blade structure is provided on the hollow cylinder.

12. The system of claim 1, further comprising a plug connector in which the electric contact element is received.

13. The system of claim 12, wherein the plug connector is a car charging plug connector.

* * * * *